Jan. 12, 1932.   T. E. JERABEK ET AL   1,840,584
METHOD OF AND APPARATUS FOR ARC WELDING
Filed March 9, 1929
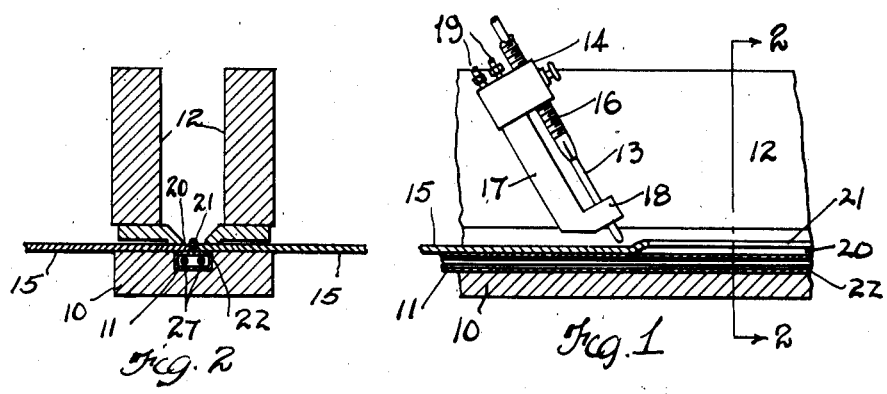
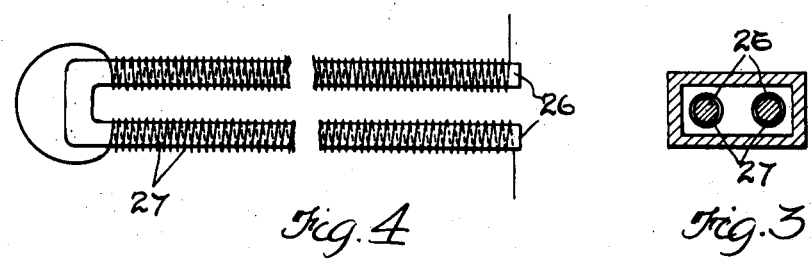
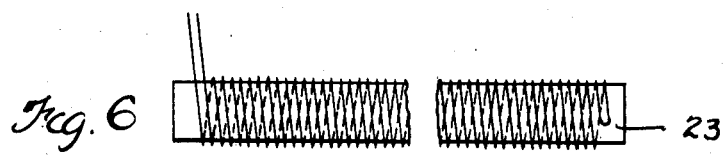
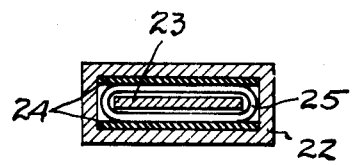
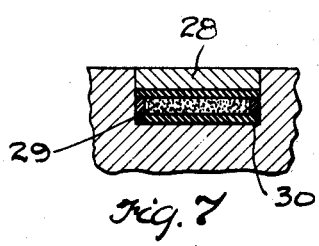
INVENTORS
Theophil E. Jerabek
BY Samuel C. Osborne.
Fay, Oberlin & Fay
ATTORNEYS.

Patented Jan. 12, 1932

1,840,584

UNITED STATES PATENT OFFICE

THEOPHIL E. JERABEK AND SAMUEL C. OSBORNE, OF CLEVELAND, OHIO, ASSIGNORS TO THE LINCOLN ELECTRIC COMPANY, OF CLEVELAND, OHIO, A CORPORATION OF OHIO

METHOD OF AND APPARATUS FOR ARC WELDING

Application filed March 9, 1929. Serial No. 345,803.

The present invention relates to electric arc welding, and its primary object, broadly stated, is to provide means whereby thin parts, and particularly thin plates can be more rapidly and satisfactorily united.

More specifically our invention contemplates providing, in combination with an electrode and the parts to be welded, a backing member and independent and positive means for heating such member, this means functioning to correct any thermal deficiencies which may be incident to the welding operation as ordinarily conducted and insuring that the deposited metal shall completely coalesce with the parts upon or between which such deposition is made. In one form, our invention contemplates using a backing strip of some suitable metal such as copper (for example) and a heating means consisting of a non-inductively wound resistor; and in another form, our invention contemplates arranging such resistor for producing a magnetic field adjacent to the arc as well as a more satisfactory thermal condition contiguous to the parts being joined. In the one case, the desired effect is obtained almost wholly by the heating, and in the other case such effect is obtained in the same manner but the heating is supplemented by the stabilizing action of the magnetic field. The use of either of these forms of our invention will result in greatly improved unions being obtained, and as above stated, such improvement is especially desirable and apparent when thin parts, such as plates or sheets, are being welded.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings:—

Fig. 1 is a longitudinal vertical view through an apparatus which is adapted for effecting the present method; Fig. 2 is a transverse section which was taken along the plane indicated by the line 2—2 of Fig. 1; Fig. 3 is an enlarged and transverse sectional view of the backing member or fire strip shown in Figs. 1 and 2; Fig. 4 is a plan view of the heating means shown in Figs. 1, 2 and 3; Fig. 5 is a transverse sectional view which shows a modification of the backing member illustrated in the first three figures; Fig. 6 is a plan view of the heating means shown in Fig. 5; and Fig. 7 is a transverse sectional view which illustrates a modification of the backing members shown in the preceding figures.

The organization which is here shown for purposes of illustration includes a support 10, a backing strip 11, the clamping or retaining devices 12, the electrode 13, and the electrode holder 14. The strip 11 is arranged within a groove or recess in the upper surface of the support 10, and its exposed face is adapted for bottoming or underlying the metal receiving fissure, groove or channel which is defined by the contiguous edges of the work. Such work consists of the sheets or plates 15, and these are held or retained in position by the clamping devices 12. The electrode 13 is adjustably held in a chunk 16 which is associated with the mounting 17, and such mounting is provided with a contact 18 through which the welding current may be conducted, and with the connections 19, these latter being adapted for receiving and discharging a suitable cooling medium such as water.

In the actual welding operation, an arc is produced between the work and the lower end of the electrode 13, and upon being shifted with relation to the groove, fissure or channel 20, such arc will function to melt the filler rod 21 and to weld the molten metal thereby formed to the heated edge portions of the sheets. If such sheets are thin, it is the practice to effect the welding rather rapidly and to use a current of comparatively small amperage, but it is found that in following this method the welds produced are sometimes defective. We have discovered that such defects are due to adverse thermal conditions, and that these in turn are due to the rapidity with which the welding is conducted, to the small amperage of the welding current, to the relatively small heat absorbing capacity of the metal of the work, and to the chilling action of the backing strip with which the heated parts of the work contact, this latter action being even more pronounced and objectionable if such strip, as usual, is made of copper.

With a view to correcting these conditions and to making it possible to carry out the welding operation at an even greater rate and without impairing the quality of the weld, we contemplate using a positively and independently heated backing member. Such member may be formed as a rectangular tube 22 (Fig. 5), and the heating means may consist of a length of resistance wire which is non-inductively wound upon a non-conducting core 23 (Fig. 6), this latter being adapted for insertion within the bore of such tube, and the heating element as a whole being suitably insulated as by the mica strip 24 and the asbestos winding 25. If desired, the backing member may be exteriorly insulated from the support 10, and if this arrangement is preferred the member itself and not the support, should be connected in the welding circuit. The structure just described functions only to heat the backing member, but if such is preferred the heating element may consist of one or more paramagnetic core elements 26 and an insulated and inductively arranged winding 27, as shown in Figs. 1, 2 and 3, this embodiment providing an electromagnetic field which has a stabilizing effect upon the arc, as well as an effective means for heating the backing member.

The modification shown in Fig. 7 employs a solid backing member 28, and this member is arranged over a heater which consists of a resistance element 29 enclosed within an insulating sheath or casing 30. In this form, such heating element may be desirably formed of a solid bar or the like, and here, as in the embodiments previously explained, some suitable means such as a rheostat may be employed for regulating the heating current.

Although the backing members above described are preferably made of some such highly conductive metal as copper, and although our invention has been described as a means for improving the weld produced between thin parts, such as plates and sheets, it will be understood that the backing member may be constituted of some such metal as steel and that in cases the process explained can be advantageously employed where other than thin parts are being joined. Furthermore, it will be understood that the heating effect can be varied according to the massiveness of the work, according to the rate at which the welding is conducted, according to the amperage of the welding current, and according to the size and material of the backing member. In general, our provided method is adapted for use when either carbon or metallic electrodes are being employed, and it will be apparent that when broadly considered such method can be advantageously used even when only one of the parts requires to be heated or where no backing member is employed; in other words, the contemplated heating can be effected in various ways and according to the requirements of the particular work in hand.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:—

1. In metal working by electricity, the steps which consist in establishing an arc between the work and a suitable electrode, relatively moving such work and the electrode to cause the latter to follow the line to be welded, and controlling the cooling rate of the welded area throughout the entire length of such line by applying heat thereto from an independent source after the welding arc has moved away.

2. In metal working by electricity, the steps which consist in establishing an arc between the work and a suitable electrode, relatively moving such work and the electrode to cause the latter to follow the line to be welded, and retarding the normal rate of cooling of the welded area throughout the entire length of such line by applying heat thereto from an independent source after the welding arc has moved away.

3. The method of welding thin metal edges which comprises the steps of bringing such edges into juxtaposition, welding together such edges with molten metal and retarding the normal rate of cooling of the welded area throughout the entire length of such line by applying heat thereto from an external source.

4. In electric arc-welding apparatus, the combination with a welding electrode movable relatively to the work, of a member of low electrical resistance and high thermal conductivity in contact with the work in the arc vicinity, and a source of heat independent of the weld producing heat in thermal communication with said member.

Signed by us, this 7" day of March, 1929.
THEOPHIL E. JERABEK.
SAMUEL C. OSBORNE.